United States Patent [19]

Yajima et al.

[11] Patent Number: 4,909,601
[45] Date of Patent: Mar. 20, 1990

[54] PROJECTION-TYPE COLOR DISPLAY DEVICE WITH LIGHT VALVES POSITIONED AT UNEQUAL DISTANCES FROM THE LIGHT SOURCE

[75] Inventors: Akitaka Yajima; Junichi Nakamura, both of Suwa, Japan

[73] Assignee: Seiko Epson Corporation, Tokyo, Japan

[21] Appl. No.: 181,122

[22] Filed: Apr. 13, 1988

Related U.S. Application Data

[63] Continuation-in-part of Ser. No. 908,479, Sep. 17, 1986, abandoned, which is a continuation-in-part of Ser. No. 786,438, Oct. 11, 1985, abandoned.

[30] Foreign Application Priority Data

Apr. 14, 1987 [JP] Japan ................................. 62-91314
Nov. 16, 1987 [JP] Japan ................................. 62-288647

[51] Int. Cl.$^4$ ............................................... G02F 1/13
[52] U.S. Cl. ................................. 350/331 R; 350/345; 350/337; 353/31
[58] Field of Search ................... 350/331 R, 345, 342, 350/334, 337, 333; 358/59, 60, 61; 353/31, 34, 37

[56] References Cited

U.S. PATENT DOCUMENTS

| | | | |
|---|---|---|---|
| 1,662,693 | 3/1928 | Astafiev | 350/172 |
| 2,202,257 | 5/1940 | Klaver | 350/172 |
| 2,737,076 | 3/1956 | Rock, Jr. | 350/320 |
| 2,754,718 | 7/1956 | Rock et al. | 350/320 |
| 2,971,051 | 12/1971 | Back | 358/55 |
| 3,303,278 | 5/1964 | Beno et al. | 358/50 |
| 3,588,326 | 6/1970 | Marle | 358/47 |
| 3,704,061 | 11/1972 | Traxis | 350/171 |
| 3,767,290 | 10/1973 | Lang et al. | 350/173 |
| 4,127,322 | 11/1978 | Jacobsen et al. | 353/31 |
| 4,191,456 | 3/1980 | Hong et al. | 353/31 |
| 4,425,028 | 1/1984 | Gagnon et al. | 350/331 R |
| 4,448,491 | 5/1984 | Okubo | 350/344 |
| 4,461,542 | 7/1984 | Gagnon | 350/331 R |
| 4,464,018 | 8/1984 | Gagnon | 350/331 R |
| 4,464,019 | 8/1984 | Gagnon | 350/331 R |
| 4,500,172 | 2/1985 | Gagnon et al. | 350/331 R |
| 4,544,237 | 10/1985 | Gagnon | 350/331 R |
| 4,679,909 | 7/1987 | Hamada et al. | 350/333 |
| 4,687,301 | 8/1987 | Ledebuhr | 350/401 |
| 4,690,526 | 9/1987 | Ledebuhr | 353/31 |
| 4,749,259 | 6/1988 | Ledebuhr | 350/337 |
| 4,759,610 | 7/1988 | Yanagisawa | 350/334 |
| 4,783,145 | 11/1988 | Stephany et al. | 350/336 |

FOREIGN PATENT DOCUMENTS

| | | |
|---|---|---|
| 1096635 | 1/1961 | Fed. Rep. of Germany . |
| 1560501 | 2/1969 | France . |
| 48-79596 | 10/1973 | Japan . |
| 60-02916 | 1/1985 | Japan . |
| 60-03291 | 1/1985 | Japan . |
| 59-37166 | 9/1985 | Japan . |
| 61-99118 | 5/1986 | Japan . |
| 475415 | 4/1937 | United Kingdom . |

OTHER PUBLICATIONS

"Matrix-Addressed Liquid Crystal Projection Display", P. J. Wild, SID 72 Digest, pp. 62, 63.
"Recent Advances in the Single-Gun Color Television Light-Valve System", William E. Good, SID 75 Digest.
"Optical Properties of a Liquid-Crystal Image Transducer at Normal Incidence: Mathematical Analysis and Application to the Off-State", G. Paul Montgomery, Jr., J. Opt. Soc. Am., vol. 70, No. 3, Mar. 1980, pp. 287–301.
"B/W and Color LC Video Displays Addressed by Poly Si TFTs", Shinji Morozumi et al., SID 83 Digest, pp. 156–157.

Primary Examiner—Stanley D. Miller
Assistant Examiner—Napoleon Thantu
Attorney, Agent, or Firm—Blum Kaplan

[57] ABSTRACT

A projection-type display device for producing a well balanced color image without the use of a neutral density filter. The device includes three liquid crystal light valves associated with the three primary colors and two dichroic mirrors. A light source generates colored light. The optical length between the light source and the light valve associated with the primary color of the colored light having the highest level of luminous intensity is greater than the optical lengths between the light source and each of the other two light valves. One of the three liquid crystal light valves is driven by circuitry to produce an image which is a mirror image of the images produced by the other two light valves.

51 Claims, 5 Drawing Sheets

PROJECTION-TYPE COLOR DISPLAY DEVICE WITH LIGHT VALVES POSITIONED AT UNEQUAL DISTANCES FROM THE LIGHT SOURCE

CROSS REFERENCE TO RELATED APPLICATIONS

This is a continuation-in-part of U.S. patent application Ser. No. 06/908,479, filed Sept. 17, 1986, now abandoned, which is a continuation-in-part of U.S. patent application Ser. No. 06/786,438, filed Oct. 11, 1985, now abandoned.

BACKGROUND OF THE INVENTION

This invention relates generally to a projection-type color display device, and more particularly to a projection-type display device using liquid crystal light valves for projecting and forming a colored image on a screen.

Conventional projection-type color display devices which use liquid crystal light valves such as disclosed in Japanese Laid Open Application No. 60-179,723 initially separate the image to be displayed into its red, green and blue wavelengths of light using a dichroic mirror. Each of these wavelengths of light is then directed toward a corresponding light valve which permits or prevents transmission of light therethrough (i.e. image modulation). The red, green and blue wavelengths of light which are permitted to pass through these light valves are synthesized by additive color mixing using dichroic mirrors, a dichroic mirror prism or the like. The synthesized image is then magnified and projected onto a screen through a projection lens.

Light sources used in projection-type color display devices are unable to project perfectly parallel rays of light. The intensity of these nonparallel rays of light, especially as the distance from the light source increases, diminishes (i.e. dampens). Consequently, the brightness of the image produced by the device diminishes.

Spectral characteristics of the light source are not constant, that is, the spectral characteristic curve is not flat. A neutral density (ND) filter is typically used to adjust the white balance of the light source. The ND filter dampens the peaks of the spectral characteristic curve. Depending upon the light source, a ND filter may be unable to provide an acceptable white balance. For example, a metal halide lamp has a spectral characteristic curve with a peak around the green wavelength. Dampening of the green light through use of an ND filter results in extremely dark images formed by a conventional projection-type color display device.

The three liquid crystal light valves within a projection-type color display are arranged so that one of the three light valves is reversed relative to the other two light valves to provide a physically compact device. By reversing this one light valve, however, light enters the light valve passing through a substrate on which a thin film layer of integrated transistors is disposed. Light striking the thin film transistors adversely affects the performance of the thin film layer of transistors. An unacceptable contrast ratio in the image and overall deterioration in the picture quality results.

Accordingly, it is desirable to provide a projection-type display using liquid crystal light valves which are assembled in a compact image display device. The device should provide bright images with a high level of picture quality and a high level of picture reproducibility. It is also desirable to provide a projection-type color display device which avoids the use of one or more filters to adjust the white balance of the light source.

SUMMARY OF THE INVENTION

Generally speaking, in accordance with the invention, light produced by a light source is separated into its primary color components by a group of dichroic mirror. Each component is directed toward a different light valve so that a first liquid crystal light valve is associated with a first primary color, a second liquid crystal light valve is associated with a second primary color and a third liquid crystal light valve is associated with a third primary color. The liquid crystal light valves including a plurality of liquid crystal picture elements are driven by an active switching array.

Each dichroic mirror is disposed within the device so that the optical length between the light source and each liquid crystal light valve is related to the level of luminous intensity of the primary color associated with the light valve produced by the light source. The three liquid crystal light valves are controlled by driving circuit so that the image produced by one of the three liquid crystal light valves is a mirror image of the images produced by the other two liquid crystal light valves.

More particularly, based on the spectral characteristics of the light source, the arrangement of the liquid crystal light valves is varied so that if a light source generates light which peaks around the red wavelength, the liquid crystal light valve associated with controlling red light will be disposed further than the other two liquid crystal light valves are from the light source. Similarly, the primary color generated by the light source having the lowest luminous intensity will have the liquid crystal light valve associated with that primary color positioned closer than the other two liquid crystal light valves are to the light source.

Once the light passes through the light valves, dichroic prisms synthesize the light by additive color mixing. The synthesized image is then projected on through a single projection lens onto a screen.

Different types of light sources can be used such as, but not limited to, a tungsten halogen lamp, a xenon lamp and a metal halide lamp.

The device also includes a light guide for guiding the light from the light source to the three liquid crystal light valves. The light guide is particularly useful in guiding light, which has scattered and which may otherwise escape from the device, toward the liquid crystal light valves. Therefore the image produced is quite bright.

A light protection layer is also provided within the device to shield at least the layer of thin film transistors (TFT) of the driving circuit which are on a substrate of the device from light.

Accordingly, it is an object of the invention to provide an improved projection-type display device using liquid crystal light valves housed within a compact image display device.

Another object of the invention is to provide an improved projection-type display device producing a high level of picture quality and high level of picture reproducibility.

It is still another object of the invention to provide an improved projection-type display device which avoids deterioration of the TFT layer due to light striking it so as to prevent the contrast ratio from being lowered and the overall picture quality produced by the device from being reduced.

Still other objects and advantages of the invention will in part be obvious and will in part be apparent from the specification.

The invention accordingly comprises the several steps and the relation of one or more of such steps with respect to each of the others, and the apparatus embodying features of construction, a combination of elements and arrangement of parts which are adapted to reflect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Embodiment 1

Figure 1:
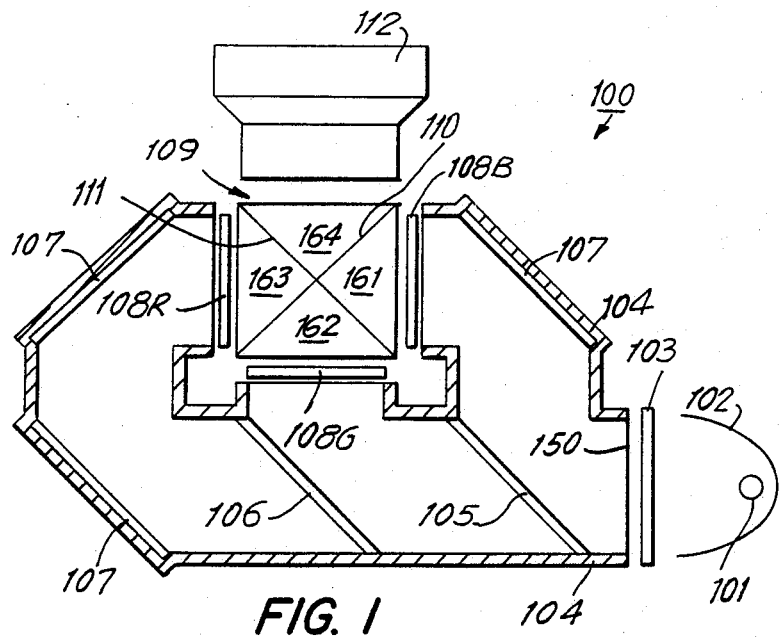
FIG. 1 is a top plan view, partially in cross section, of a projection-type color display device in accordance with one embodiment of the invention.

As shown in FIG. 1, a projection-type color display device 100 includes a tungsten halogen lamp which serves as a light source 101. White light representative of the image to be projected is emitted from light source 101, concentrated by a parabolic mirror 102 and directed toward a filter 103 for absorbing heat rays within the infrared region of the white light.

Parabolic mirror 102 concentrates (i.e. condenses) the light rays so as to provide substantially parallel rays of light directed toward filter 103. Nevertheless, these light rays are not parallel. The quality of the image represented by the light is directly affected by the parallelism of the light rays. As the optical distance from the light source to each of the liquid crystal light valves 108B, 108G and 108R increases, the quality of the light and the quality of the image represented by the light decreases. Parabolic mirror 102 can be made from, but is not limited to, a combination of spherical mirrors and condensor lenses or an ellipsodial reflector.

Light transmitted through filter 103 (i.e. visible radiation) enters a dichroic mirror group which includes a light guide 104, a blue light dichroic mirror 105, a green light dichroic mirror 106 and reflection mirrors 107. Light guide 104 includes a tube having an opening 150 through which light enters light guide 104 from filter 103. The size of opening 150 is substantially the same as the size of the image (i.e. picture) transmitted by a liquid crystal light valve 108B, a liquid crystal light valve 108G and a liquid crystal light valve 108R. The dichroic mirror group serves to segregate the colored image into its primary colors. The mirror-like surfaces of blue light dichroic mirror 105, green light dichroic mirror 106 and reflection mirrors 107 bend and direct the colored light towards liquid crystal light valves 108B, 108G and 108R.

The internal surfaces of light guide 104 except for reflection mirror 107 are planished with aluminum by vacuum deposition to improve their reflective properties. Light is prevented from scattering and escaping from device 100 by light guide 104. Light guide 104 serves to maintain a high level of brightness of light striking liquid crystal light valves 108B, 108G and 108R. Blue light dichroic mirror 105, green light dichroic mirror 106 and reflection mirrors 107 are positioned within and affixed to light guide 104.

As the colored light passing through opening 150 strikes blue light dichroic mirror 105, the blue colored light, (i.e. having a wavelength of about 500 nanometers (nm) or less) is reflected toward reflection mirrors 107 which redirect the path of the blue light toward liquid crystal light valve 108B.

Light which is substantially yellow in color passes through blue light dichroic mirror 105 and strikes green light dichroic mirror 106. Green light dichroic mirror 106 reflects green colored light (i.e. having a wavelength of about 500 nm to approximately 590 nm) towards liquid crystal light valve 108G.

Light passing through green light dichroic mirror 106 has a substantially red color and is redirected by reflection mirror 107 towards liquid crystal light valve 108R.

The colored light of light source 101, which now has been segregated into its primary colors of blue, green and red, is color modulated by liquid crystal light valves 108B, 108G and 108R, respectively. Driving circuit including a matrix array of thin film transistors (TFT), discussed in greater detail below, applies the appropriate signals to each of these liquid crystal light valves for controlling the transmission of the primary color therethrough. The colored lights which pass through liquid crystal light valves 108B, 108G and 108R are then synthesized by a dichroic prism group 109 and magnified for projection by a projection lens 112.

Figure 2:
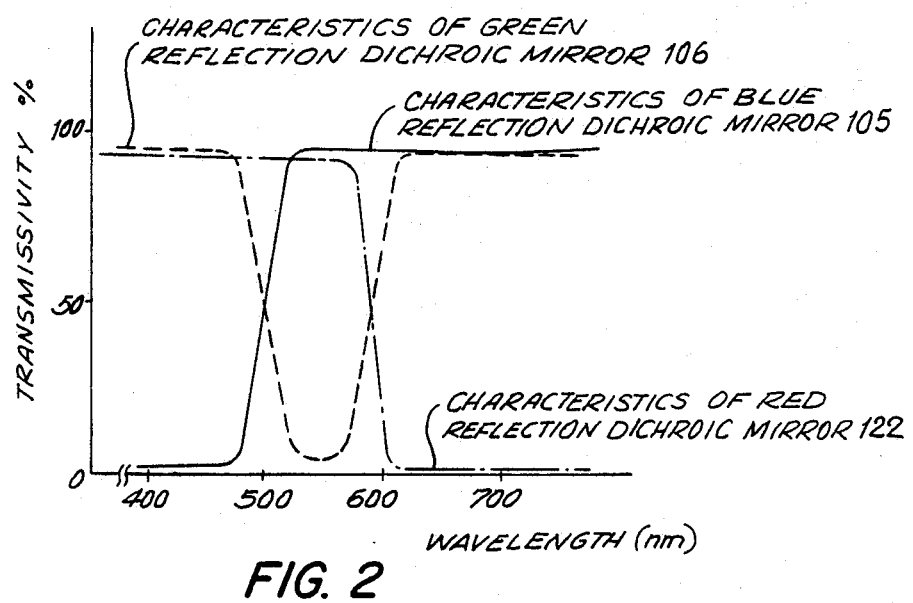
FIG. 2 is a plot of transmissivity versus wavelength of the dichroic mirrors.

As shown in FIG. 2, the transmissive characteristics of blue light dichroic mirror 105, green light dichroic mirror 106 and a red light dichroic mirror 122 ( discussed below) are graphically illustrated.

Figure 3:
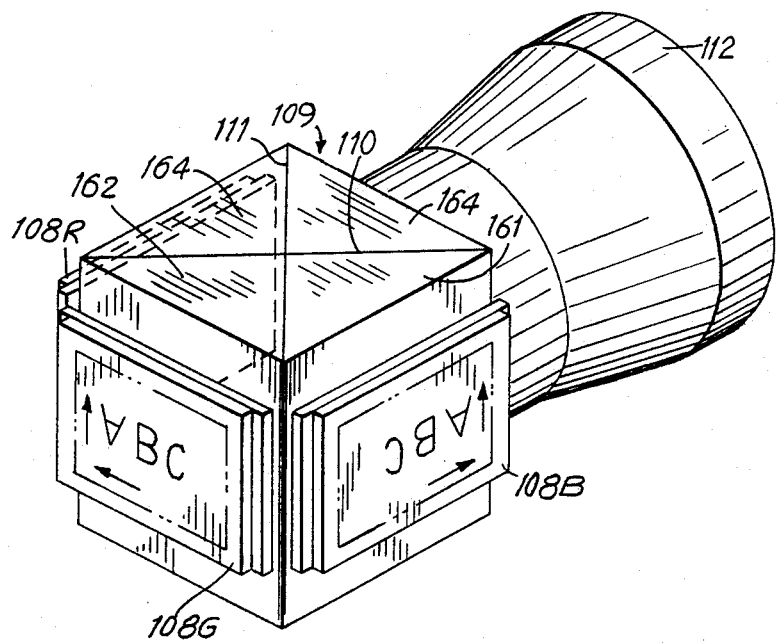
FIG. 3 is a diagrammatic perspective view of the liquid crystal light valves and dichroic prisms.

FIG. 3 illustrates the arrangement of dichroic prism group 109 which includes four separate right angled dichroic prisms 161, 162, 163 and 164. A red reflection surface 110 crosses at a substantially right angle to a blue reflection surface 111. Prisms 161, 162, 163 and 164 are connected together by an optical bonding agent or other suitable material. Red reflection surface 110 and blue reflection surface 111 are formed by vapor deposition of a dielectric multi-layer film on the right angled surfaces of prisms 161, 162, 163 and 164. The spectral characteristics of red reflection surface 110 and blue reflection surface 111 are the same as those shown for red light dichroic mirror 122 and blue light dichroic mirror 105 of FIG. 2.

Red colored light passing through liquid crystal light valve 108R is reflected by red reflection surface 110. Blue colored light passing through liquid crystal light valve 108B is reflected by blue reflection surface 111. Green colored light passing through liquid crystal light valve 108G is transmitted without reflection through dichroic prism group 109. The red, green and blue colored lights after being synthesized by dichroic prism group 109 form a single colored image which is projected onto a screen (not shown) by single projection lens 112. Adjustment of the optical and/or positional relation among the three liquid crystal light valves as viewed from projection lens 112 may be required in order to obtain an acceptable single colored image. The single colored image produced by projection-type display device 100 avoids color drifts even around the displayed image while achieving a high saturation of color due to a perfect additive mixture of color stimuli by each pixel.

Figure 4:
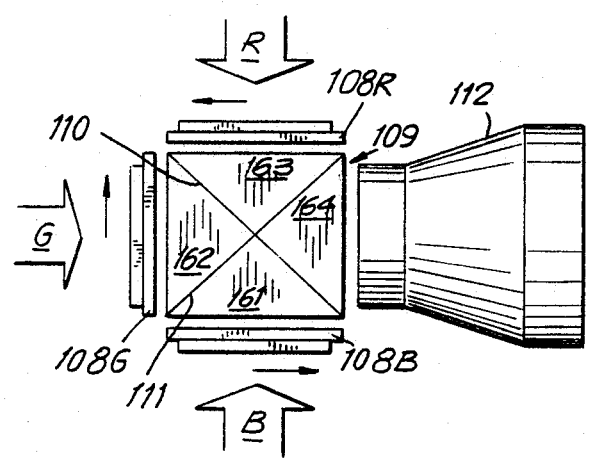
FIG. 4 is a diagrammatic top plan view of the liquid crystal light valves, dichroic prisms and projection lens.

Images displayed on the screen are from left to right and from top to bottom. To create such an image on the screen, the blue, green and red images produced by liquid crystal light valves 108B, 108G and 108R, respectively, are displayed in the directions shown in FIGS. 3 and 4. The image displayed by each liquid crystal light valve is turned upside down. The direction of the image produced by liquid crystal light valve 108G is also turned sideways. The directions of images produced by liquid crystal light valves 108R and blue light liquid crystal light valve 108B are turned sideways by red reflection surface 110 and blue reflection surface 111 of dichroic prism group 109, respectively. The synthesized image produced by dichroic prism group 109 is then turned upside and in a sideways direction again by projection lens 112 to create an image displayed on the screen which is from left to right and from top to bottom. In assembling device 100, red light liquid crystal light valve 108R or blue light liquid crystal light valve 108B can be turned over and used as liquid crystal light valve 108G. The properties of light valve 108G, however, would then deteriorate more quickly (as discussed below). Therefore it is not practical to use as liquid crystal light valve 108G another liquid crystal light which has been turned over.

Figure 5:
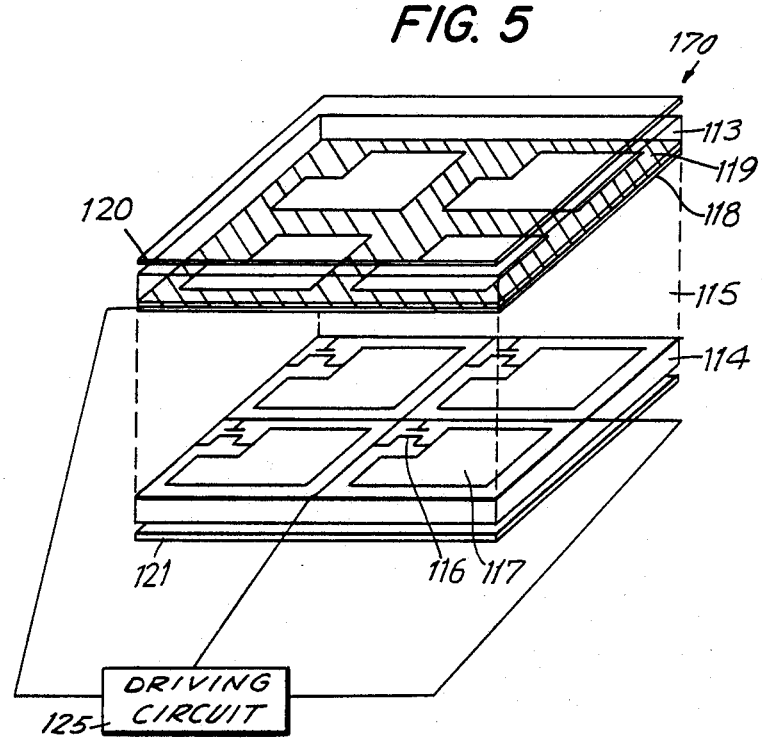
FIG. 5 is a diagrammatic perspective view, partially in cross section, of a liquid crystal light valve.

The construction of light valves 108B, 108G and 108R is illustrated by a light valve 170 shown in FIG. 5. Light valve 170 is an active matrix type liquid crystal valve and includes a fused quartz lower transparent substrate 114. A driving circuit 125 may be formed on the interior substrate 114 or attached to light valve 170 and drives a matrix array of a picture element electrode 117 coupled to a corresponding thin film transistor (TFT) 116. An upper transparent glass substrate 113 is spaced apart from lower substrate 114 by spherical spacers (not shown). Liquid crystal material 115 is disposed in the space between upper substrate 113 and lower substrate 114. A common electrode 118 and a light protection layer 119 are formed on upper substrate 113. Light protection layer 119 shields at least TFT 116 and data and signal lines formed on lower substrate 114 from light. Driving circuit 125 selectively turns picture elements in light valve 170 on and off. Suitable materials for forming TFT 116 include, but are not limited to, polysilicon, amorphous silicon and a compound semiconductor. Other suitable elements with two terminals having diode characteristics may be used in place of TFT 116, such as a ring diode, metal insulator metal (MIM) or simple matrix driving. An upper polarization plate 120 is disposed on the exterior surface of upper substrate 113. A lower polarization plate 121 is disposed on the exterior surface of lower substrate 114. Only light with a specific polarized angle will be transmitted through liquid crystal light valve 170.

Depending upon the voltage applied to liquid crystal driving electrode 117, the picture element of pixel will be in a turned-on state (ON condition) or a turned-off state (OFF condition). Each pixel in liquid light valve 170 therefore acts like a shutter for controlling transmission of light therethrough. Generally, TFT 116 is quite sensitive to and is adversely affected by light striking it. In particular, when light strikes TFT 116, the ON-OFF threshold level (i.e. ratio) changes resulting in a deterioration in the contrast ratio of the image produced by liquid crystal light valve 170. Therefore, light enters liquid crystal light valve 170 by passing through upper substrate 113 so that light protection layer 119 shields at least TFT 116 from light.

In order to avoid the need to invert a light valve such as liquid crystal light valve 108R or liquid crystal light valve 108B to form liquid crystal light valve 108G, the driving circuit associated with light valve 108G limits light valve 108G to production of an image which is a mirror image (i.e. a reflectively symmetric image) of the images produced by light valves 108R and 108B. The driving circuit associated with light valve 108G can be built into light valve 108G or attached to its outer frame. A driving circuit built into light valve 108G includes mask correction. If the driving circuit is connected to the outer frame of light valve 108G, the connection will be different from the connections made between light valves 108B and 108R to their associated driving circuits By providing a driving circuit for controlling one of the three liquid crystal light valves so that only mirror images are transmitted therethrough, device 100 produces a high quality picture with excellent contrast ratio.

Liquid crystal valves 170 include a twisted nematic (TN) liquid crystal material The liquid crystal material has a double refraction ratio $\Delta$ n whose optimum value is in accordance with the primary color passing therethrough to obtain a high contrast ratio.

The optical distance between liquid crystal light valve 108R and light source 101 is longer than the optical distances between liquid crystal light valve 108G and light source 101 or liquid crystal light valve 108B and light source 101. Consequently, red light from light source 101 is dampened more than blue light or green light is before reaching its associated light valve.

Figure 6:
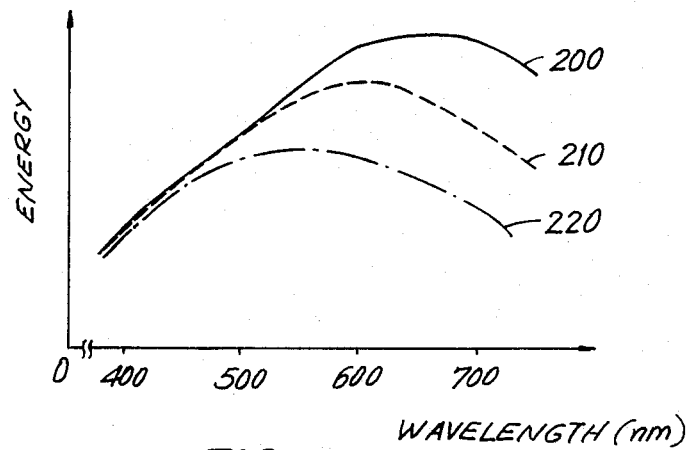
FIG. 6 is a plot of luminous energy levels versus wavelengths of a conventional tungsten halogen lamp and of the projection-type display devices of FIG. 1 and FIG. 7.

The spectral characteristics of a tungsten halogen lamp are represented by a solid line 200 shown in FIG. 6. Tungsten halogen lamps peak (i.e. have a high level of luminous intensity) around the wavelength of red light. With a tungsten halogen lamp serving as light source 101 and radiating white light at a low color temperature of about 3000°K the image produced by device 100 has a color temperature of about 6000°K with a spectral curve represented by a dotted line 210 in FIG. 6. A filter, such as an ND filter, is not required for maintaining color balance. The image produced by device 100 has a high saturation level with excellent color reproducibility and meets the well known television standards (i.e. NTSC, PAL and SECAM) set for broadcasting and communications.

Device 100 with a tungsten halogen lamp serving as light source 101 displays a well balanced image having a high level of picture quality. Dichroic mirror group segregates the colored light into its primary colors and is positioned within device 100 so that the optical lengths associated with the primary colors vary. Similar results can be achieved using other white light sources having spectral characteristics similar to a tungston halogen lamp (i.e. spectral curve peaks around the wavelength for red light).

Figure 7:
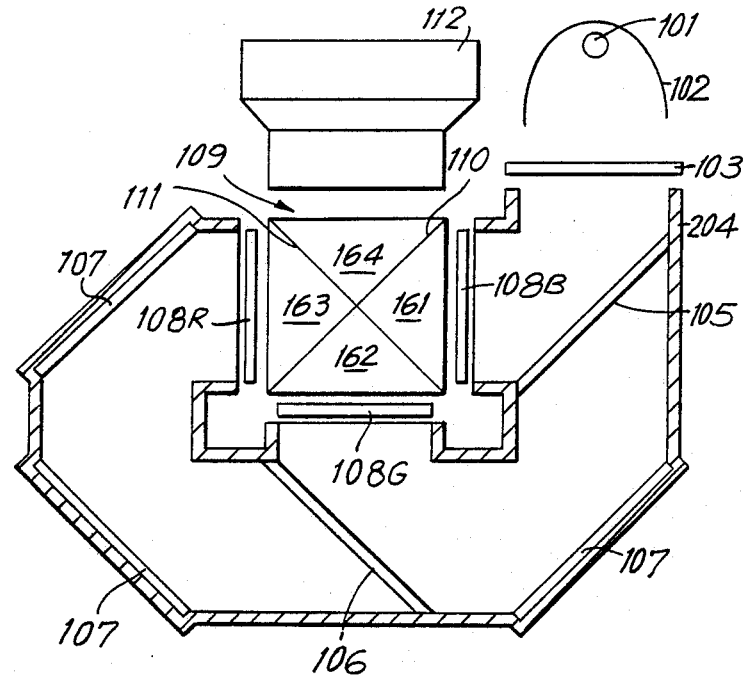
FIG. 7 is a top plan view, partially in cross section, of a projection-type display device in accordance with an alternative embodiment of the invention.

As shown in FIG. 7, a projection-type display device 300 also employs a tungsten halogen lamp as light source 101. The construction and operation of device 300 is similar to that of device 100 except that the position of dichroic mirrors 105 and 106 and light source 101 have been changed and a rearranged light guide 204 is provided. The optical distance between light source 101 and liquid crystal light valve 108R is greater than the optical distance between light source 101 and liquid crystal light valve 108G which is greater than the optical distance between light source 101 and liquid crystal light guide 108B. Therefore, red light is damped more than green light which is damped more than blue light. With a tungsten halogen lamp having a color temperature of about 9300°K, which is the color temperature of white light displayed by a cathode-ray tube, the image displayed by device 300 will have a white color temperature of about 9000°K. The image will be well balanced with a high saturation level and a substantially flat spectral curve represented by a dot-dash line 220 of FIG. 6.

When using a tungsten halogen lamp as light source 101, it is more effective to minimize the optical length of blue light. Accordingly, dichroic mirrors 105 and 106 are arranged so that the optical distances increase for the primary colors beginning with blue light, increasing to green light and ending with red light (i.e. red light having the greatest optical distance).

Embodiment 2

Figure 8:
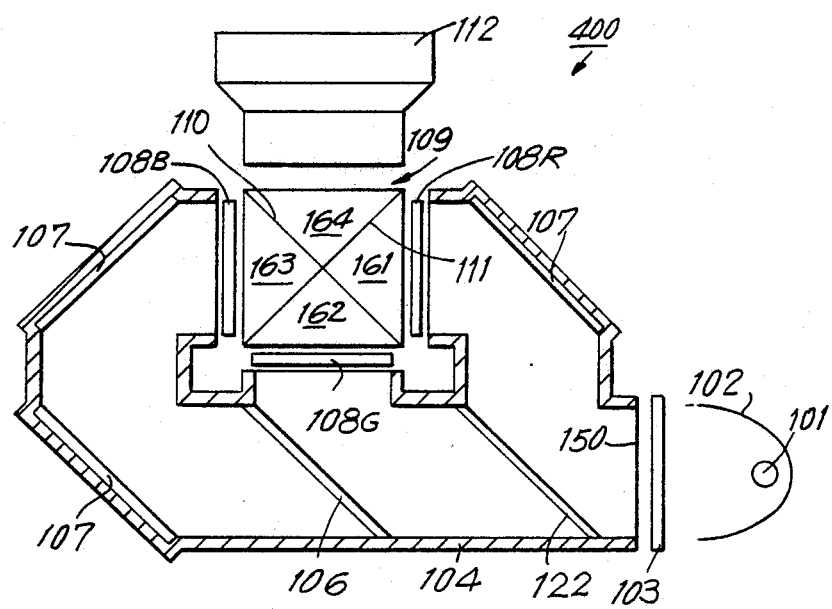
FIG. 8 is a top plan view, partially in cross section, of a projection-type display device in accordance with another alternative embodiment of the invention.
Figure 9:
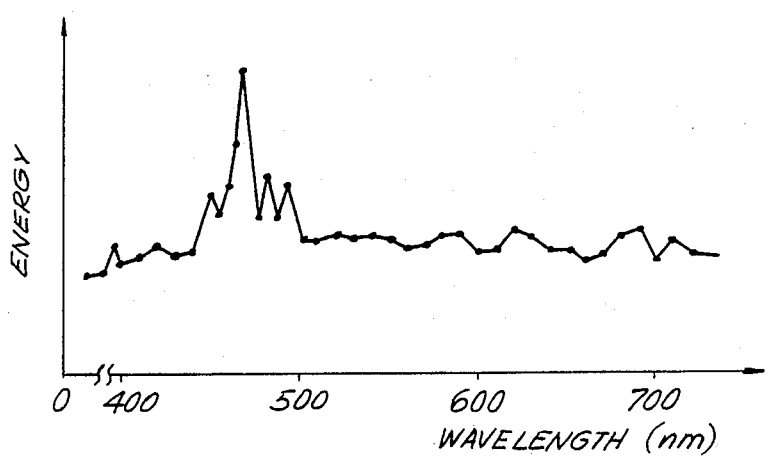
FIG. 9 is a plot of luminous energy level versus wavelength of a conventional xenon lamp.

As shown in FIG. 8, a projection-type display device 400 uses a xenon lamp as light source 101. The spectral characteristics of a conventional xenon lamp are shown in FIG. 9 wherein the peak energy level is within the range of the blue wavelength of light. That is, a xenon lamp has a high level of luminous intensity around the wavelength for blue light.

Device 400 is similar to device 100 in construction except that a xenon lamp is used for light source 101, blue light dichroic mirror 105 is replaced with red light dichroic mirror 122, and the positions of light valves 108B and 108R, and red reflection surface 110 and blue reflection surface 111 are switched. A substantially right angle is maintained between reflection surfaces 110 and 111. The spectral characteristics of red light dichroic mirror 122 are shown in FIG. 2.

Light passing through opening 150 strikes red light dichroic mirror 122 which reflects that portion of the visible light having a wavelength of about 590 nm and greater. The red light is then redirected by reflection mirror 107 towards light valve 108R. Green light contained within the visible light transmitted through red light dichroic mirror 122 is reflected by green light dichroic mirror 106 towards liquid crystal light valve 108G. The residual visible light transmitted through green light dichroic mirror 106 is reflected by reflection mirror 107 and directed toward liquid crystal light valve 108B.

Since a xenon lamp has a spectral characteristic which includes a peak around the wavelength for blue light, liquid crystal light valve 108B rather than liquid crystal light valves 108G or 108R is disposed furthest from light source 101 of device 400. Blue light will be dampened more than the green light or the red light emitted from the xenon lamp creating a well balanced color image produced by device 400. Light sources having wavelengths with peaks around the wavelength for blue light other than a xenon lamp also can be used in device 400 as light source 101 resulting in production of a well balanced color image. In this embodiment, a red modulation liquid crystal light valve 8R is replaced with a blue modulation liquid crystal light valve 8B, and a green modulation light valve 8G displays reflectively symmetric images in the same way as in the Embodiment 1.

Embodiment 3

Figure 10:
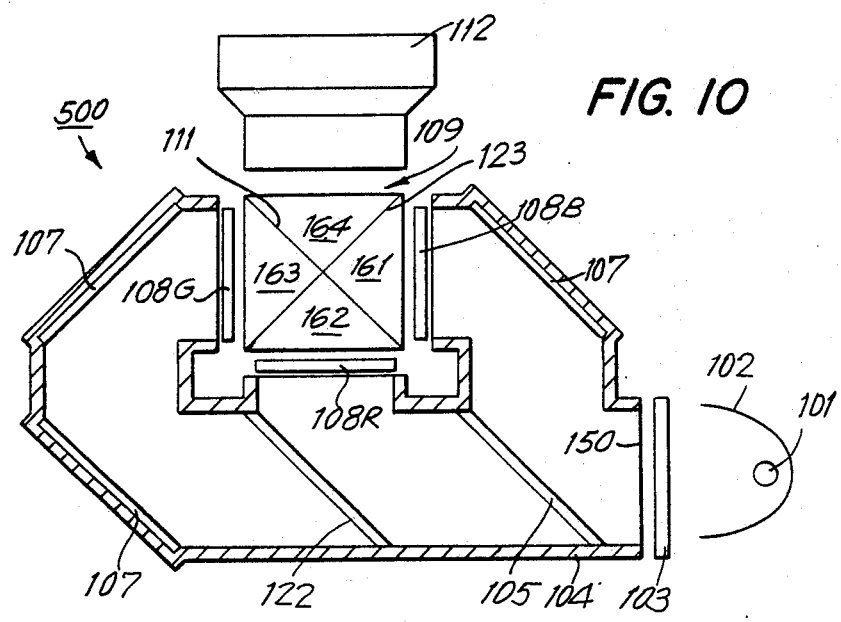
FIG. 10 is a top plan view, partially in cross section, of a projection-type display device in accordance with yet another alternative embodiment of the invention.

As shown in FIG. 10, a projection-type display device 500 is substantially similar to device 100 except that a metal halide lamp is used as light source 101, green dichroic mirror 106 is replaced with red dichroic mirror 122, liquid crystal light valves 108G and 108R are switched and red reflection surface 110 is replaced with a green reflection surface 123.

Figure 11:
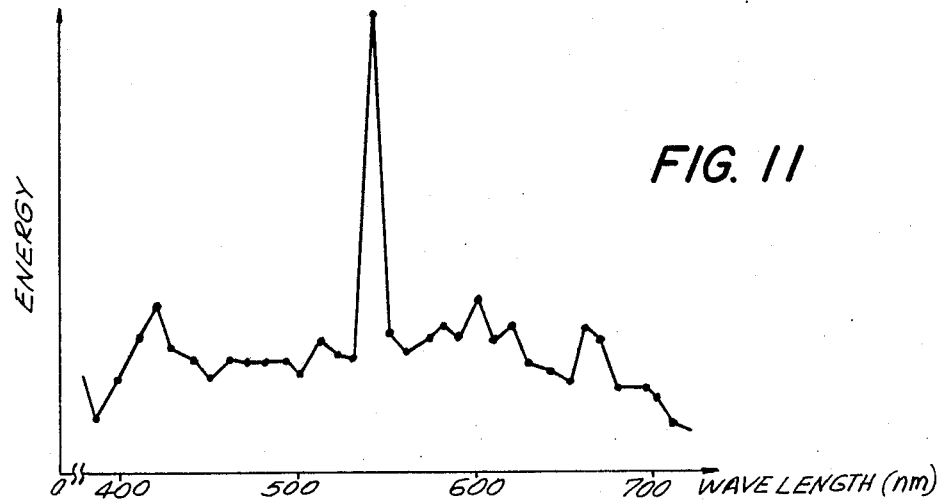
FIG. 11 is a plot of luminous energy level versus wavelength of a conventional metal halide lamp.

Referring momentarily to FIG. 11, the spectral characteristics for a conventional metal halide lamp are shown. A peak within the spectral curve occurs around the wavelength for green light. In other words, the spectral curve has its highest level of luminous intensity occuring around the wavelength for green light.

In operation, light passing through opening 150 of device 500 is reflected by blue dichroic mirror 105 and redirected by reflection mirror 107 towards liquid crystal light valve 108B. Light passing through blue dichroic mirror 105 which strikes red dichroic mirror 122 reflects the red light therein toward liquid crystal light valve 108R. The residual visible light passing through red light dichroic mirror 122 is reflected by reflection mirror 107 towards liquid crystal light valve 108G.

Liquid crystal light valve 108G and liquid crystal light valve 108B both produce an image which is upside down but not reversed in direction. The image provided by liquid crystal light valve 108R, however, is turned both upside down and reversed in direction.

Reflection surface 111 reverses the direction of the image produced by liquid crystal light valve 108B. Similarly, the image produced by liquid crystal light valve 108G is reversed in direction by green reflection surface 123. Green reflection surface 123 is similar to red reflection surface 110 of device 100 in its position within dichroic prism group 109. Green reflection surface 123 and blue reflection surface 111 cross each other at substantially right angles. The wavelength characteristics of blue reflection surface 111 and green reflection surface 123 are the same as those shown for blue dichroic mirror 105 and green dichroic mirror 106 of FIG. 2.

The optical lengths between the metal halide lamp serving as light source 101 and each of the three liquid crystal light valves is designed so that green light has the furthest distance to travel from light source 101 before reaching its corresponding light valve (i.e. light valve 108G). Light valve 108G is no longer restricted by its corresponding driving circuit to produce mirror images. Instead, light valve 108R is now restricted to producing mirror images due to its corresponding driving circuit. Consequently, a well balanced color image is produced by device 500 having a substantially flat spectral characteristic curve.

If the spectral curve of the metal halide lamp includes peaks at not only the green wavelength but also at the red wavelength, a well balanced color image having high saturation can be obtained by modifying the construction of light guide 104 of device 500 to conform to light guide 204 of device 300 of FIG. 7. More particularly, the position of liquid crystal light valves 108G, 108R and 108B as well as blue reflection surface 111 and green reflection surface 123 remain as shown in device 500 of FIG. 10. The construction of light guide 104 and position of light source 101, however, are changed to conform to the construction and position of light guide 204 and light source 101 in device 300. Green dichroic mirror 122 replaces and is in the position shown for red dichroic mirror 106 of device 300. Blue dichroic mirror 105 is in the position as shown in device 300. Consequently, the optical distance between light source 101 and light valve 108B is less than the optical distance between light source 101 and light valve 108R which is less than the optical distance between light source 101 and light valve 108G.

Light sources having a high level of luminous intensity for wavelengths around green light can be used in place of a metal halide lamp as light source 101 for device 500 while providing the same excellent color balance and high level of color reproducibility.

As now can be readily appreciated, projection-type display devices 100, 300, 400 and 500 produce a white balanced image without the use of filters such as, but not limited, to a ND filter. The elimination of such filters is achieved, in part, by providing that the optical distance between light source 101 and the light valve associated with the primary color having the highest level of luminous intensity generated by light source 101 is greater than the optical distances between light source 101 and each of the other two light valves. Similarly, the invention provides that the optical distance between light source 101 and the light valve associated with the primary color having the lowest level of luminous intensity is less than the optical distances between light source 101 and each of the other two light valves. The invention provides an image having a high saturation level with extremely high color temperature and excellent color reproducibility which meets the television industry standards set for broadcasting and communication.

Scattering of light which can reduce the brightness of the image produced by a projection-type display device is eliminated by light guide 104. Therefore, light from white source 101 representative of the image is efficiently utilized providing a bright image displayed by the invention.

The active elements of the matrix-type liquid crystal light valve are advantageously controlled by driving circuit 125 so that one of the three liquid crystal light valves displays only a mirror image of the images produced by the other two liquid crystal light valves. TFTs 116 are protected from light striking it through light protection layer 119. Additionally, the invention provides for construction of a projection-type display device which is compact in size with a high contrast ratio and excellent overall quality of the image.

It will thus be seen that the objects set forth above, and those made apparent from the preceding description, are efficiently obtained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. A projection-type display device comprising:
   a light source for producing light having a plurality of colors;
   segregating means for segregating the light into the plurality of colors including at least a first color and a second color; and
   liquid crystal light valve means including at least a first light valve and a second light valve, said first light valve positioned to receive said first color and said second light valve positioned to receive said second color;
   wherein the optical lengths from the light source to the first light valve and from the light source to the second light valve are unequal and are based on the luminous intensities of the first color and the second color, respectively.

2. The projection-type display device of claim 1, wherein each light valve of the liquid crystal light valve means is a liquid crystal panel.

3. The projection-type display device of claim 1, wherein the first color has the greatest luminous intensity of all the colors produced by the light source and is associated with the longest optical length.

4. The projection-type display device of claim 2, wherein the first color has the greatest luminous intensity of all the colors produced by the light source and is associated with the longest optical length.

5. The projection-type display device of claim 1, wherein the second color has the smallest luminous intensity of all the colors produced by the light source and is associated with the shortest optical length.

6. The projection-type display device of claim 2, wherein the second color has the smallest luminous intensity of all the colors produced by the light source and is associated with the shortest optical length.

7. The projection-type display device of claim 3, wherein the second color has the smallest luminous intensity of all the colors produced by the light source and is associated with the shortest optical length.

8. The projection-type display device of claim 1, wherein the liquid crystal light valve means includes a third light valve, and third light valve positioned to receive a third color.

9. The projection-type display device of claim 3, wherein the first color is red.

10. The projection-type display device of claim 7, wherein the first color is red.

11. The projection-type display device of claim 5, wherein the second color is blue.

12. The projection-type display device of claim 10, wherein the second color is blue.

13. The projection-type display device of claim 12, in which a tungsten halogen lamp serves as the light source.

14. The projection-type display device of claim 8, wherein the first light valve includes means for producing a first image, the second light valve includes means for producing a second image and the third light valve includes means for producing a third image and further including circuit means for controlling the images produced by the liquid crystal light valves wherein the third image produced by the third liquid crystal light valve is a mirror image of the first image and a mirror image of the second image.

15. The projection-type display device of claim 12, wherein the liquid crystal light valve means includes a third light valve, said third light valve positioned to receive a third color.

16. The projection-type display device of claim 15, wherein the first light valve includes means for producing a first image, the second light valve includes means for producing a second image and the third light valve includes means for producing a third image and further including circuit means for controlling the images produced by the liquid crystal light valves wherein the third image produced by the third liquid crystal light valve is a mirror image of the first image and a mirror image of the second image.

17. The projection-type display device of claim 16, in which a tungsten halogen lamp serves as the light source.

18. The projection-type display device of claim 17, further including light guide means for guiding the colored light towards each of the liquid crystal light valves.

19. The projection-type display device of claim 18, further including light protection means for shielding portions of the circuit means from light.

20. The projection-type display device of claim 19, further including prism means for reversing the direction of the image produced by said two of three liquid crystal light valves.

21. The projection-type display device of claim 3, wherein the first color is blue.

22. The projection-type display device of claim 7, wherein the first color is blue.

23. The projection-type display device of claim 5, wherein the second color is red.

24. The projection-type display device of claim 22, wherein the second color is red.

25. The projection-type display device of claim 24, in which a xenon lamp serves as the light source.

26. The projection-type display device of claim 24, wherein the liquid crystal light valve means includes a third light valve, said third light valve positioned to receive a third color.

27. The projection-type display device of claim 26, wherein the first light valve includes means for producing a first image, the second light valve includes means for producing a second image and the third light valve includes means for producing a third image and further including circuit means for controlling the images produced by the liquid crystal light valves wherein the third image produced by the third liquid crystal light valve is a mirror image of the first image and a mirror image of the second image.

28. The projection-type display device of claim 27, in which a xenon lamp serves as the light source.

29. The projection-type display device of claim 28, further including light guide means for guiding the colored light towards each of the liquid crystal light valves.

30. The projection-type display device of claim 29, further including light protection means for shielding portions of the circuit means from light.

31. The projection-type display device of claim 30, further including prism means for reversing the directions of the first image and the second image.

32. The projection-type display device of claim 3, wherein the first color is green.

33. The projection-type display device of claim 7, wherein the first color is green.

34. The projection-type display device of claim 5, wherein the second color is blue.

35. The projection-type display device of claim 33, wherein the second color is blue.

36. The projection-type display device of claim 35, in which a metal halide lamp serves as the light source.

37. The projection-type display device of claim 35, wherein the liquid crystal light valve means includes a third light valve, said third light valve positioned to receive a third color.

38. The projection-type display device of claim 37, wherein the first light valve includes means for producing a first image, the second light valve includes means for producing a second image and the third light valve includes means for producing a third image and further including circuit means for controlling the images produced by the liquid crystal light valves wherein the third image produced by the third liquid crystal light valve is a mirror image of the first image and a mirror image of the second image.

39. The projection-type display device of claim 38, in which a metal halide lamp serves as the light source.

40. The projection-type display device of claim 39, further including light guide means for guiding the colored light towards each of the liquid crystal light valves.

41. The projection-type display device of claim 40, further including light protection means for shielding portions of the circuit means from light.

42. The projection-type display device of claim 41, further including prism means for reversing the direction of the image produced by said two of three liquid crystal light valves.

43. The projection-type liquid crystal light valve of claim 14, further including integrating means for combining the first, second and third images and producing a synthesized image, and projecting means for projecting the synthesized image.

44. The projection-type display device of claim 9, in which a tungsten halogen lamp serves as the light source.

45. The projection-type display device of claim 21, in which a xenon lamp serves as the light source.

46. The projection-type display device of claim 32, in which a metal halide lamp serves as the light source.

47. The projection-type display device of claim 8, in which said first liquid crystal light valve is disposed between the second and third liquid crystal light valves.

48. The projection-type display device of claim 1, further including light guide means for guiding the colored light towards each of the liquid crystal light valves.

49. The projection-type display device of claim 14, further including light protection means for shielding portions of the circuit means from light.

50. The projection-type display device of claim 14, further including prism means for reversing the directions of the first image and the second image.

51. A method for displaying an image projected from a liquid crystal display device which includes a first liquid crystal light valve, a second liquid crystal light valve and a third liquid crystal light valve, comprises:

segregating light produced by a light source into its primary colors;

positioning segregating means within the device so that the optical lengths between the light source and the three liquid crystal light valves are unequal and based on the luminous intensity of the primary color associated with the respective light valve produced by the light source;

producing a first image from the first liquid crystal valve, a second image from the second liquid crystal liquid valve and a third image from the third liquid crystal light valve; and controlling the images produced by the liquid crystal light valves whereby the first image is a mirror image of the second image and the third image.

* * * * *